Aug. 18, 1970  S. V. AHAMED  3,525,026
APPARATUS RESPONSIVE TO THE SLIP OF AN ELECTRICAL MACHINE
Filed Aug. 5, 1968
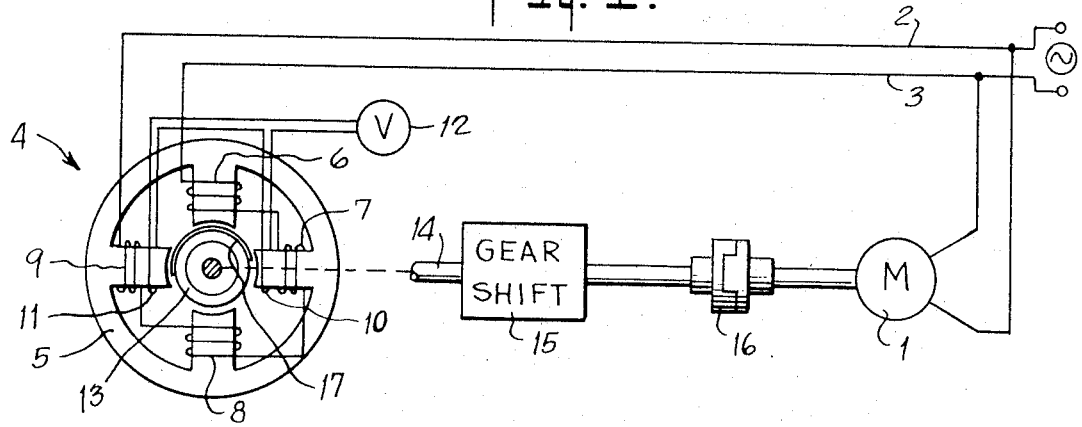
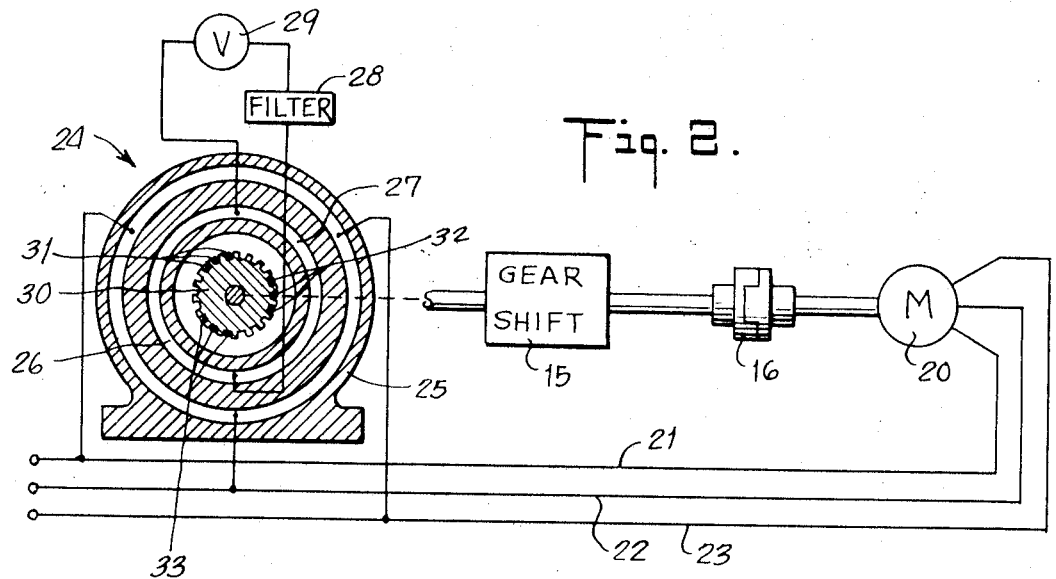
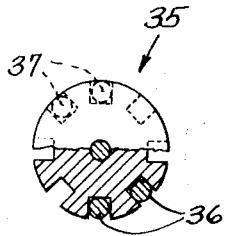
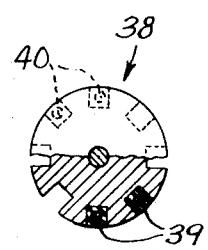
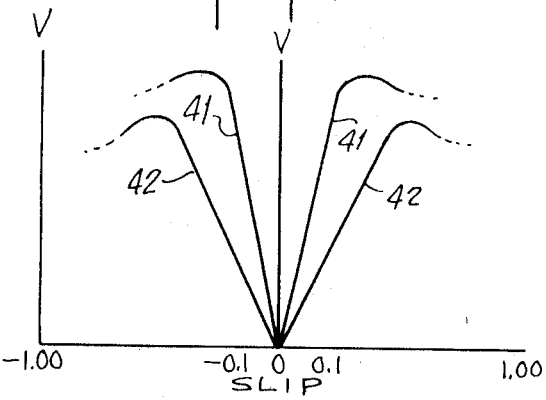
INVENTOR.
SYED V. AHAMED
BY Lester W Clark
ATTORNEY

United States Patent Office 3,525,026
Patented Aug. 18, 1970

3,525,026
APPARATUS RESPONSIVE TO THE SLIP OF AN
ELECTRICAL MACHINE
Syed V. Ahamed, Morris Plains, N.J., assignor to Research Corporation, New York, N.Y., a nonprofit corporation of New York
Filed Aug. 5, 1968, Ser. No. 750,219
Int. Cl. H02p 1/42
U.S. Cl. 318—232             9 Claims

ABSTRACT OF THE DISCLOSURE

Apparatus responsive to the slip of an electrical machine, e.g., an induction motor. Apparatus includes a rotor adapted for mechanical connection to rotor of machine whose slip is to be measured, and a stator having a primary winding with terminals adapted for electrical connection to terminals of machine whose slip is to be measured. The rotor has electrical characteristics which vary cyclically $n$ times around its periphery. The primary winding has P poles. The stator also has a secondary winding with $P \pm 2n$ poles. The voltage across the secondary winding is a substantially linear function of slip over a substantial range, and may be applied to a voltage sensitive device to effect a measurement or control operation as a function of slip.

BACKGROUND OF THE INVENTION

This invention relates to apparatus for measuring the slip of an alternating current electrical machine. Most alternating current machines have a synchronous speed, which is determined by the supply frequency and the number of poles on the armature winding of the machine. If a machine, i.e., a motor or generator, is intended to operate at its synchronous speed, it is known as a synchronous motor or generator and its slip is zero under normal running conditions. An induction motor runs at a speed somewhat lower than its synchronous speed, depending on the load on the motor. The slip may be defined as the percentage difference between the actual speed of the motor and the synchronous speed, the latter being taken as 100%. Slip values on common motors do not usually run much over 10%. If the load gets too great and the slip too high, the motor will reach a breakdown point beyond which its torque progressively decreases, and the motor will draw increasingly heavy current and will eventually stall if not disconnected from the line by circuit breakers or other protective apparatus.

There has been in the prior art no convenient simple apparatus for measuring slip directly. Commonly, slip is determined by measuring the actual speed, subtracting it from the synchronous speed and the calculating the resulting slip in revolutions per minte as a percentage of the synchronous speed.

It has been proposed to measure slip directly by providing two opposing generators, one being driven at the synchronous speed and the other being driven at the speed of the motor whose slip is being measured. The outputs of the two generators are bucked against each other and the difference voltage provides a direct measure of the slip. (See Pierce, Pat. No. 1,686,638.)

It has also been proposed to measure slip by means of a hand held apparatus having a set of two or three cascaded rotors and stators, with the final rotor driving a pointer across the scale against a spring. Such an arrangement is shown in Swiss Pat. No. 83,898.

It has also been suggested to measure slip by taking the ripple voltage between the neutral points of a Y—Y connected three-phase motor (see Noodleman, No. 2,650,336).

SUMMARY OF THE INVENTION

The apparatus of the invention comprises a stator having primary and secondary windings and a rotor whose electrical characteristics vary cyclically around its periphery. There must be $n$ complete variations in the electrical characteristics of the rotor, where $n$ may be any whole number. The primary winding on the stator has P poles, where P is any even number. The secondary winding on the stator must have $P \pm 2n$ poles. If the primary winding is connected to the terminals of the electrical machine whose slip is to be measured and the rotor is mechanically connected to the rotor of that machine, then the voltage induced across the secondary winding is a substantially linear function of slip over a substantial range, and may be applied to a voltage sensitive device to effect either a measurement of slip or a control operation in response to slip.

BRIEF DESCRIPTION OF THE DRAWING

FIG. 1 is a somewhat diagrammatic illustration of a slip measuring apparatus embodying the invention;

FIG. 2 is a wiring diagram of a more complex slip measuring apparatus embodying the invention;

FIG. 3 is a graphical illustration of the variation of output voltage with slip in apparatus constructed in accordance with the invention;

FIG. 4 is a cross-sectional view of one form of rotor which may be used in slip measuring apparatus according to the invention;

FIG. 5 is a cross-sectional view similar to FIG. 4, showing an alternate form of rotor.

DETAILED DESCRIPTION—FIG. 1

FIG. 1 shows a motor 1 whose slip is to be measured, having its terminals connected across a pair of AC supply lines 2 and 3. A slip measuring device constructed in accordance with the invention is shown at 4, and includes a four pole stator 5 having series connected primary windings 6, 7, 8 and 9, and series connected secondary windings 10 and 11. The output of the secondary windings 10 and 11 is connected to a voltmeter 12. A rotor 13 cooperates with the stator 5 and its shaft 14 is connected through a gear shift 15 and a clutch 16 to the motor 1, during the measurement of its slip.

The rotor 13 has one peripheral dissymmetry, shown at 17 and consisting of one segmental block of copper on the surface of the rotor, it being understood that the rest of the rotor is constructed of ferromagnetic material rather than highly electrically conductive material such as copper.

The secondary windings 10 and 11 have induced in them by transformer action from the coils 7 and 9, electromotive force at the supply frequency. However, since the coils 10 and 11 are connected in series opposition with respect to that frequency, these electromotive forces cancel each other so that they do not produce any output voltage at the voltmeter 12. The secondary windings 10 and 11 also have induced in them a voltage created by the rotation of rotor 13, and alternating due to the presence of dissymmetry 17 therein, which voltage varies in proportion to the slip of the rotor, and increases with the slip until a maximum is reached. The two coils 10 and 11 are in series aiding with respect to this voltage, so that it appears at the terminals of the series connected secondary winding and is applied to the voltmeter 12, where it may be read as an indication of slip.

It is necessary that the stator have a number of poles P, which being an even number must be at least equal to 2. It is further necessary that the secondary winding have a number of poles which is equal to $P \pm 2n$, where $n$ is the number of cyclically repeated and equally-spaced dissymmetries around the periphery of the rotor.

In the arrangement shown in FIG. 1, $n$ is equal to 1, so that the number of poles on the secondary winding is equal to 4—2, or 2. The slip measuring apparatus 4, having four poles, has a synchronous speed of 1800 r.p.m., assuming a supply frequency of 60 Hz. If the motor 1 has a different number of poles and hence a different synchronous speed, the gear shift 15 must be operated to select a suitable gear ratio so that the slips of the two are the same. Specifically, the gear ratio must be proportional to the ratio of the synchronous speeds of the slip measuring device 4 and the motor 1. Thus, since the device 4 has a synchronous speed of 1800 r.p.m., then if the motor 1 has a synchronous speed of 3600 r.p.m., the gear shift must be set for one rotation of the shaft 14 for every two rotations of the motor 1.

FIG. 2

This figure illustrates a somewhat more complex form of apparatus constructed in accordance with the invention, including a three-phase motor 20 supplied from power lines 21, 22 and 23 and a slip measuring device 24, including a stator 25 having a three-phase primary winding 26 connected to the lines 21, 22 and 23, and a single phase secondary winding 27 whose terminals are connected through a filter 28 to a voltmeter 29. The filter 28 blocks any harmonic of the primary frequency. A rotor 30 cooperates with the stator 25 and its shaft is connected through a gear shift 15 and a clutch 16 to the motor 20. The rotor 30 has three peripheral dissymmetries 31, 32 and 33, in the form of three distinct and equally-spaced sections of a cage winding embedded in the rotor slots.

As shown in FIG. 2, it is entirely permissible and even desirable for slip measuring purposes to use a single phase secondary winding in cooperation with a three-phase primary winding. Such a secondary winding arrangement helps to cancel out any harmonic coupling that may exist between the two windings due to the presence of stator and rotor teeth. Skewing or rotor and stator teeth further reduces any such possible couplings.

The same criteria as to number of poles applies as in the case of FIG. 1. That is to say, if $n$ is the number of peripheral dissymmetries on the rotor, then the number of poles in the secondary must be equal to $P \pm 2n$.

In order to balance the rotor, so as to prevent excessive wear at the rotor bearings, it is desirable to have at least two peripheral dissymmetries on the rotor, placed diametrically opposite. Furthemore, in the interest of simplicity, it is desirable to keep the number of poles low. If $n=2$, then $2n=4$. If the secondary winding poles are made equal to $P \pm 2n$, then since there must be at least two poles in the primary, then there must be at least $2+4=6$ poles in the secondary. Thus, the simplest pole arrangement then possible is a two pole primary and a six pole secondary. If the criteria for the number of secondary poles is chosen to be $P-2n$, and since then the lowest number for $2n$ is 4 and P must be greater than 4, then the smallest possible number for P is 6; thus the simplest device then has a six pole primary and a two pole secondary.

However, in order to provide a device with a synchronous speed of 1800 r.p.m. instead of 3600 r.p.m., and thus reduce bearing wear and increase the life of the device, it is more desirable to make $P=4$. Then if $n=2$, the number of poles in the secondary winding is $P+2n=8$.

FIGS. 3–5

FIG. 3 shows the variation of output voltage with slip for two different rotor configurations, respectively shown in FIGS. 4 and 5. The rotor 35 of FIG. 4 has two equally-spaced electrical dissymmetries 36 and 37, consisting of two sections of copper cage winding embedded in the slots of a usual laminated rotor of magnetic material. In FIG. 5, the rotor 38 has two peripheral dissymmetries 39 and 40, similarly consisting of two sections of copper cage winding embedded in the rotor slots. However, the bars 39 and 40 are much smaller, for a rotor of the same rotor slot dimensions, than are the copper bars 36 and 37 of FIG. 4. Thus the rotor of FIG. 5 has a higher ratio of resistance to leakage reactance than the rotor of FIG. 4. Referring to FIG. 3, the curve 41 shows the variation of output voltage with slip for the rotor 35 of FIG. 4 and the curve 42 shows the variation of output voltage with slip for the rotor 38 of FIG. 5. It may be seen that the linear portion of the curve 42 extends over a wider range of slip than the linear portion of the curve 41. Nevertheless, the curve 41 is steeper and thus more sensitive within its linear range than the curve 42. By interchanging the rotors 35 and 38, the characteristics of the slip meter can be selected to match the range of slip variation expected to be encountered in the machine being tested.

Where a slip meter is intended to be portable, and to be shifted around from one machine to another for test purposes, it is desirable to construct the slip measuring device with the simplest winding arrangements, i.e., two poles on the primary and six poles on the secondary and to use a gear shift as required to compensate for different synchronous speeds which may be employed in the motors being tested. However, in some cases, it may be desirable to have a slip meter permanently built into an electrical machine. For example, this might be done in a large synchronous generator where the slip meter is to be used to control the field current during the start up period of the generator so that the field current will not be turned on until the generator is at or near its synchronous speed. In that event, the slip meter should be built with the number of poles on its primary winding the same as the number of poles on the generator to which it is permanently connected, and the number of poles on the secondary winding of the slip measuring device may be either $P+2n$ or $P-2n$. This avoids the necessity of having a speed changing gear between the rotors.

What is claimed is:
1. Apparatus responsive to the slip of an electrical machine having a rotor and a stator, including:
   (a) a slip measuring rotor adapted for connection to the rotor of the electrical machine for concurrent rotation therewith at the same slip;
   (b) a slip measuring stator including a primary winding having P poles and terminals adapted for connection to the terminals of the electrical machine whose slip is being measured;
   wherein the improvement comprises:
   (c) $n$ electrical dissymmetries in the periphery of the slip measuring rotor;
   (d) a secondary winding on the slip measuring stator having ($P \pm 2n$) poles; and
   (e) voltage responsive means connected to the secondary winding.

2. Apparatus as defined in claim 1, in which the secondary winding has ($P+2n$) poles.

3. Apparatus as defined in claim 2, in which $P=2$, $n=2$, and the secondary winding has six poles.

4. Apparatus as defined in claim 1, wherein $P=4$, $n=2$, and the number of poles in the secondary winding is $P+2n=8$.

5. Apparatus as defined in claim 1, in which the secondary winding has $(P-2n)$ poles.

6. Apparatus as defined in claim 5, in which $P=6$, $n=2$, and the secondary winding has two poles.

7. Apparatus as defined in claim 1, including clutch means and gear shift means to connect the rotor of the electrical machine to the slip measuring rotor.

8. Apparatus as defined in claim 1, in which said primary winding is a three-phase winding and said secondary winding is a single phase winding.

9. Apparatus as defined in claim 1, including filter means connected in series with said secondary winding to block the flow of current therefrom at harmonics of the frequency of the primary winding.

References Cited

UNITED STATES PATENTS

| | | | |
|---|---|---|---|
| 1,686,638 | 10/1928 | Pierce | 318—490 |
| 3,378,744 | 4/1968 | Seney | 318—490 |

ORIS L. RADER, Primary Examiner

K. L. CROSSON, Assistant Examiner

U.S. Cl. X.R.

318—240, 490; 73—136

UNITED STATES PATENT OFFICE
CERTIFICATE OF CORRECTION

Patent No. 3,525,026    Dated August 18, 1970

Inventor(s) SYED V. AHAMED

It is certified that error appears in the above-identified patent and that said Letters Patent are hereby corrected as shown below:

Col. 3, line 67, "$P\pm 2n$" should read -- $P+2n$ --.

SIGNED AND
SEALED
JAN 5 1971

SEAL
Attest:

Edward M. Fletcher, Jr.
Attesting Officer

WILLIAM E. SCHUYLER, JR.
Commissioner of Patents